G. W. BOLTON.
COMBINED FUEL ECONOMIZER AND CARBON ELIMINATOR FOR GAS ENGINES.
APPLICATION FILED MAY 9, 1917.
1,263,735.
Patented Apr. 23, 1918.
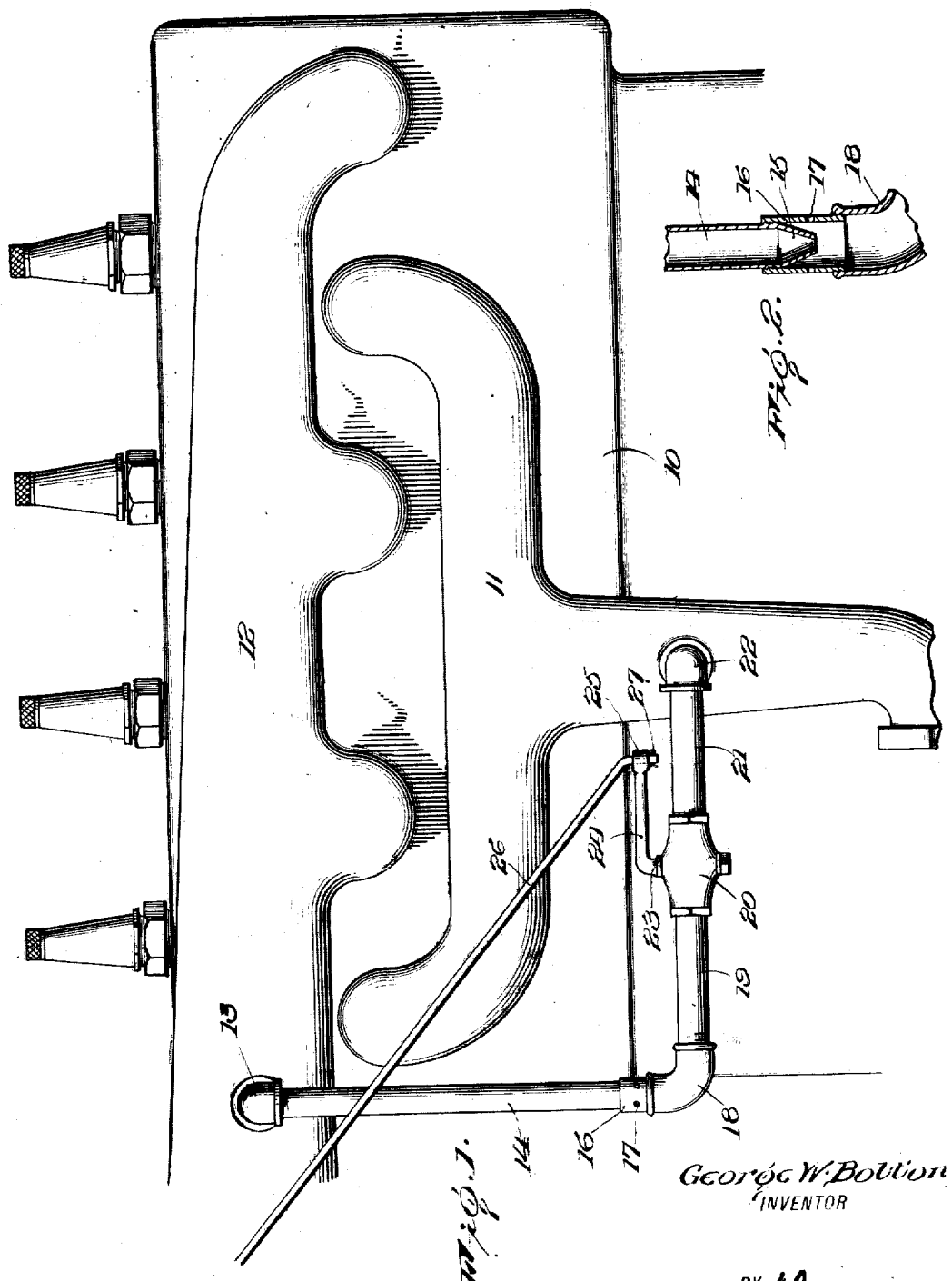
George W. Bolton
INVENTOR
BY
ATTORNEYS

UNITED STATES PATENT OFFICE.

GEORGE W. BOLTON, OF NASHVILLE, TENNESSEE.

COMBINED FUEL-ECONOMIZER AND CARBON-ELIMINATOR FOR GAS-ENGINES.

1,263,735.  Specification of Letters Patent.  Patented Apr. 23, 1918.

Application filed May 9, 1917. Serial No. 167,586.

*To all whom it may concern:*

Be it known that I, GEORGE W. BOLTON, a citizen of the United States, residing at Nashville, in the county of Davidson and State of Tennessee, have invented certain new and useful Improvements in Combined Fuel-Economizers and Carbon-Eliminators for Gas-Engines, of which the following is a specification.

My invention relates to new and useful attachments for gas engines, the primary object of my invention being the provision of a combined fuel economizer and carbon eliminator which may be readily attached to gas engines such as are now used in automobiles, without necessitating any structural changes in the engine.

A further object which I have in view is the provision of an attachment by means of which predetermined quantities of mixed air and hot exhaust gases may be supplied to the intake manifold of the carbureter to heat and otherwise render more explosive the fuel mixture supplied to the engine cylinders so as to give the engine greater speed and power and to insure more complete combustion of the fuel and, consequently, eliminate formation of carbon in the cylinders.

Another object which I have in view is the provision of a device of this character in the form of a conduit leading from one manifold to the other and provided with air inlet openings and with an injector nozzle disposed in operative relation to the openings and through which the exhaust gases pass.

With these and other objects in view, my invention will be more fully described, illustrated in the accompanying drawings, and then specifically pointed out in the claims which are attached to and form a part of this application.

In the drawings:

Figure 1 is a fragmentary elevation of a conventional form of gas engine, showing my attachment applied thereto;

Fig. 2 is a fragmentary sectional view, showing the air inlets and injector nozzle structure.

Corresponding and like parts are referred to in the following description and indicated in all the views of the drawings by the same reference characters.

In order to insure a clear and accurate understanding of my invention and the manner of applying it, I have illustrated the device in connection with a conventional form of gas engine 10 having the usual inlet manifold 11 and exhaust manifold 12.

My invention includes an elbow coupling 13 which has one branch tapped into the exhaust manifold just to the rear of the back cylinder. A pipe section 14 has one end threaded into the free arm of this elbow and its opposite end reduced to provide a frusto-conical injector nozzle 15 which projects into a bushing or sleeve 16 which, at a point substantially opposite the nozzle, is formed with a plurality of peripherally spaced air inlet openings 17 of relatively small size. The free end of this sleeve threads into an elbow coupling 18 and a pipe 19 is threaded into the other arm of the coupling and into the inlet branch of a valve 20 of the usual turn plug or other preferred type. A pipe 21 leads from the outlet branch of this valve to one arm of an elbow coupling 22, the opposite arm of which is tapped into the trunk of the inlet manifold 11. The valve stem 23 of the valve 20 has an operating arm 24 formed at its free end with an eye 25 to receive the angularly disposed terminal of a control rod 26 which is secured against displacement by a cotter pin 27. This control rod may run to a foot pedal or hand lever or may be connected to the throttle valve lever, as preferred.

In operation, the engine is started, with the valve closed, and run for a few minutes in this manner until the exhaust manifold has become highly heated. The valve 20 is then opened to the proper extent, dependent upon climatic conditions, the richness of the mixture being supplied to the engine, and the speed at which the engine is being operated. Under these circumstances, a certain amount of exhaust gases is drawn from the exhaust manifold through the pipe 14 and injector nozzle 15 into the pipe 19 and so through the valve 20 and pipe 21 into the inlet manifold 11. The passage of these gases through the injector nozzle acts to draw in a quantity of air through the openings 17 in the sleeve 16 which air mixes with and enriches the exhaust gases. This mixture of exhaust gases and fresh air which, of course, will be at a high temperature, due to the heat of the exhaust gases, mingles with the fuel in the intake manifold and passes with it to the engine cylinders.

Preferably, for the average four-cylinder internal combustion engine, the various pipes and couplings should have substantially a quarter of an inch passage, under which circumstances the reduced passage through the nozzle will be about one-eighth of an inch in diameter. For larger engines, such as six, eight and twelve cylinder engines, the size of the pipe and diameter of the nozzle should be correspondingly increased. For instance, on a six-cylinder engine, the conduits or pipes may have a three-eighths inch passage and the nozzle a one-quarter of an inch passage. I have fully tested this attachment and find that it does not cause overheating of the engine or back pressure on the engine, that more power is obtained, increasing the mileage of a motor vehicle when the device is employed with its engine, and that formation of carbon is prevented.

Although I have illustrated and described my invention in all its details of construction, it will of course be understood that I do not wish to limit myself to such details, but reserve the right to make any changes, within the scope of the appended claims without in the slightest degree departing from the spirit of my invention.

Having thus described the invention, what is claimed as new is:

1. The combination with an internal combustion engine having inlet and exhaust manifolds, of means extending between and communicating with the said manifolds and provided with an opening for supplying to the inlet manifold air through the opening and exhaust gases from the exhaust manifold mixed in uniform parts, and a valve located between the opening and the inlet manifold and controlling the flow of the mixed supply.

2. The combination with a gas engine having inlet and exhaust manifolds, of elbows tapped into the manifolds, a pipe leading from that elbow tapped into the exhaust manifold, the end of the pipe being shaped to provide a frusto-conical injector nozzle, a sleeve into which such pipe end is threaded formed with openings for admission of air, a valve, a pipe communicating between the sleeve and valve, and a pipe communicating between the valve and that elbow tapped into the inlet manifold.

3. An attachment for gas engines including a tubular conduit provided intermediate its length with air inlet openings, a valve interposed in the length of the conduit, and means at the ends of the conduit adapted to be tapped one into an exhaust manifold and the other into an inlet manifold, the valve being interposed between the openings and that end of the conduit adapted to communicate with the inlet manifold.

4. An attachment for gas engines including elbows, one adapted to be tapped into an exhaust manifold and the other adapted to be tapped into an intake manifold, a pipe leading from the first elbow and having one end thereof shaped to provide a frusto-conical injector nozzle, a sleeve into which such pipe end is threaded and provided with openings for admission of air, and a pipe connection between the sleeve and the second elbow.

In testimony whereof I affix my signature.

GEORGE W. BOLTON. [L. S.]